(12) United States Patent
van Niekerk et al.

(10) Patent No.: US 10,314,371 B2
(45) Date of Patent: Jun. 11, 2019

(54) CLAMPING ELEMENT AND COMPONENT CONNECTION HAVING A CLAMPING ELEMENT

(71) Applicant: Bayerische Motoren Werke Aktiengesellschaft, Munich (DE)

(72) Inventors: Johann van Niekerk, Munich (DE); Maik Hammer, Bruckberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 362 days.

(21) Appl. No.: 15/164,065

(22) Filed: May 25, 2016

(65) Prior Publication Data

US 2016/0262500 A1 Sep. 15, 2016

Related U.S. Application Data

(63) Continuation of application No. PCT/EP2014/078128, filed on Dec. 17, 2014.

(30) Foreign Application Priority Data

Jan. 15, 2014 (DE) .................. 10 2014 200 552

(51) Int. Cl.
*A44B 17/00* (2006.01)
*F16B 21/04* (2006.01)
(Continued)

(52) U.S. Cl.
CPC ........ *A44B 17/0041* (2013.01); *A44B 17/007* (2013.01); *A44B 17/0023* (2013.01);
(Continued)

(58) Field of Classification Search
CPC combination set(s) only.
See application file for complete search history.

(56) References Cited

U.S. PATENT DOCUMENTS 2,282,360 A 5/1942 Horrocks
3,512,226 A * 5/1970 Carlile .................. A44B 17/00
24/669
(Continued)

FOREIGN PATENT DOCUMENTS

CN 1163580 A 10/1997
CN 1295653 A 5/2001
(Continued)

OTHER PUBLICATIONS

International Search Report (PCT/ISA/210) Issued in PCT Application No. PCT/EP2014/078128 dated Mar. 5, 2015, with English translation (four (4) pages).
(Continued)

*Primary Examiner* — Jason W San
(74) *Attorney, Agent, or Firm* — Crowell & Moring LLP

(57) ABSTRACT

A component connection has a first component, from which a fixing element protrudes, and a clamping element, which in a tightened rotating position is directly supported relative to the first component directly by way of the fixing element or is indirectly supported relative to the first component by way of a further component. The clamping element has a recess into which the fixing element protrudes from a lower side of the clamping element, wherein a seat portion of the recess is designed in the form of an ascending spiral staircase or thread and at least one free end of the fixing element reaches behind this seat portion in an interlocking manner, such that the at least one free end is seated on the seat portion and when the clamping element is in the tightened rotating position, presses against the seat portion.

18 Claims, 3 Drawing Sheets

(51) Int. Cl.
*F16B 21/16* (2006.01)
*B60R 13/00* (2006.01)
*F16B 2/16* (2006.01)

(52) U.S. Cl.
CPC .......... *A44B 17/0076* (2013.01); *B60R 13/00* (2013.01); *F16B 21/04* (2013.01); *F16B 21/165* (2013.01); *F16B 2/16* (2013.01)

(56) References Cited

U.S. PATENT DOCUMENTS

| | | | | |
|---|---|---|---|---|
| 4,166,309 | A * | 9/1979 | Schenk | F16B 21/04 411/350 |
| 5,369,856 | A * | 12/1994 | Hauser | A44B 17/0023 24/110 |
| 5,642,960 | A * | 7/1997 | Salice | E05D 5/02 403/328 |
| 5,897,278 | A | 4/1999 | Frattarola | |
| 6,071,035 | A * | 6/2000 | McKelvy | B25F 3/00 403/320 |
| 2003/0231927 | A1* | 12/2003 | Hale | B08B 9/045 403/349 |
| 2010/0284767 | A1* | 11/2010 | Shue | C03B 9/165 411/553 |
| 2011/0027038 | A1* | 2/2011 | Hsu | H01L 23/4093 411/105 |
| 2011/0079573 | A1* | 4/2011 | Nakamura | B65D 43/0231 215/331 |
| 2011/0110716 | A1* | 5/2011 | Slater | A61F 2/4684 403/348 |
| 2011/0283496 | A1* | 11/2011 | Taniguchi | A44B 17/0029 24/697.1 |
| 2014/0093327 | A1* | 4/2014 | Bowers | F16B 39/24 411/111 |
| 2015/0121667 | A1* | 5/2015 | Humpert | A44B 17/0041 24/687 |
| 2016/0183642 | A1* | 6/2016 | Fiedler | A45C 13/1069 24/303 |
| 2016/0206053 | A1* | 7/2016 | Mitsuo | A44B 17/0041 |
| 2016/0227886 | A1* | 8/2016 | Van Niekerk | B23K 31/02 |
| 2016/0366503 | A1* | 12/2016 | Miller | H04R 1/028 |
| 2018/0132576 | A1* | 5/2018 | Hashimoto | A44C 5/2057 |

FOREIGN PATENT DOCUMENTS

| | | |
|---|---|---|
| DE | 85 29 669.4 U1 | 1/1986 |
| EP | 0 052 538 A2 | 5/1982 |
| FR | 2 567 085 A1 | 1/1986 |
| GB | 107151 | 6/1917 |
| WO | WO 96/14911 A1 | 5/1996 |

OTHER PUBLICATIONS

German Office Action issued in counterpart German Application No. 10 2014 200 552.3 dated Oct. 7, 2014 (five (5) pages).

Chinese-language Office Action issued in counterpart Chinese Application No. 201480058768.2 dated Sep. 22, 2017 with partial English translation (Five (5) pages).

Chinese-language Office Action issued in counterpart Chinese Application No. 201480058768.2 dated Feb. 4, 2017 with English translation (Nineteen (19) pages).

* cited by examiner

CLAMPING ELEMENT AND COMPONENT CONNECTION HAVING A CLAMPING ELEMENT

CROSS REFERENCE TO RELATED APPLICATIONS

This application is a continuation of PCT International Application No. PCT/EP2014/078128, filed Dec. 17, 2014, which claims priority under 35 U.S.C. § 119 from German Patent Application No. 10 2014 200 552.3, filed Jan. 15, 2014, the entire disclosures of which are herein expressly incorporated by reference.

BACKGROUND AND SUMMARY OF THE INVENTION

The present invention relates to a clamping element and to a component connection having the clamping element.

It is the object of the invention to provide a clamping element with which a high-strength connection between the clamping element and a fixing element protruding from a component can be produced in a simple manner, and to provide a corresponding component connection.

A clamping element according to the invention is suitable for producing an interlocking component connection. The clamping element according to the invention has a "circumferential wall" and the interior of the clamping element has a recess accessible from a lower side of the clamping element. A rising supporting portion designed in the manner of a spiral staircase or a thread is provided on an inner side of the circumferential wall or in a recess of the circumferential wall.

With a clamping element of this type, a component connection can be produced in a simple manner, this being explained in more detail below.

The component connection according to the invention has a first component from which a "fixing element" protrudes. The first component can be, for example, a plate or a metal sheet, in particular a body component of a vehicle. However, the invention is not restricted to applications in the vehicle sector, but rather can be used entirely universally, for example also in the furniture sector, in the "white goods" sector, etc. The component connection furthermore has a clamping element which is functionally similar to a nut (screw nut). In order to produce the component connection, the clamping element is first of all placed onto the fixing element protruding from the first component. By rotation of the clamping element about a vertical axis (for example perpendicular with respect to the first component at the contact point of the fixing element), the clamping element can be "tightened". In a tightened rotational position of the clamping element, the latter is supported:

a) directly on the fixing element and
b) directly on the first component or indirectly on the first component via a further component.

The clamping element according to the invention has a recess into which the fixing element projects from a lower side of the clamping element. A "supporting portion" provided in the interior of the clamping element is designed in a curved manner and rises in the manner of a spiral staircase or a thread. It can be provided that the supporting portion extends in the interior of the clamping element over an angular range of less than 360°.

The fixing element has at least one free end which engages behind the supporting portion from above in an interlocking manner. As a result, the at least one free end of the fixing element rests from above on the supporting portion of the clamping element and, in the tightened rotational position of the clamping element, presses from above downward onto the supporting portion and therefore onto the entire clamping element, with the result that the clamping element is braced against the first component.

As a result, the clamping element is supported directly on or by the fixing element as mentioned above under a). Upon appropriate firm tightening, i.e. rotation of the clamping element in the tightening direction about the vertical axis thereof, a lower region of the clamping element—as mentioned above under b)—presses against the first component either directly or indirectly via a second component.

According to a development of the invention, the clamping element has an end stop which can be formed, for example, by a rib or the like. The end stop defines a maximally tightened rotational position of the clamping element. The clamping element can therefore be maximally rotated or tightened until the at least one free end of the fixing element or another portion of the fixing element bears against the end stop.

According to a development of the invention, the supporting portion of the clamping element is designed in such a manner that, in the tightened state of the clamping element, a type of "self-locking" is produced which prevents an automatic release or unscrewing of the clamping element.

Self-locking of this type can be achieved by the supporting portion being provided with at least one "latching point", wherein, in the tightened rotational position, the clamping element bears against the at least one latching point of the supporting portion and engages behind or over the latter there from above. Preferably, a plurality of latching points of this type are provided along the supporting portion, and therefore, during the tightening, the clamping element can be tightened in a ratchet-like manner from one latching point to the "next higher latching point". Owing to the design of the supporting portion in the manner of a spiral staircase or a rising thread, the distance of latching points following one another, as measured from the lower side of the clamping element, increases or decreases from one latching point to the next latching point (depending on the direction of view along the supporting portion).

The at least one latching point or the plurality of latching points provided along the supporting portion can be formed in each case by a trough-like depression. During the tightening of the clamping element, the free end of the fixing element therefore latches in a first latching point or trough-like depression. If the clamping element is tightened or rotated further or to a greater extent, a certain torque has to be initially applied such that the free end of the fixing element can slide out of the first latching point, until the free end of the fixing element has latched in place at the next higher latching point or in the next higher trough-like depression.

According to a development of the invention, the at least one free end of the fixing element is of convex design. A convex geometry facilitates the further rotation from one latching point to the next and reduces the risk of tilting. The at least one free end of the fixing element can preferably be of spherical or ball-shaped design. It is expressly emphasized that the fixing element does not necessarily have only one free end. On the contrary, it can be provided that the fixing element has two or more free ends which, in the tightened rotational position of the clamping element, press against the supporting portion thereof at different points. Even in the case of a fixing element which has a plurality of free ends, it can be provided that the free ends are of spherical or ball-shaped design.

The fixing element can be produced from metal, in particular from steel or aluminum. The fixing element can be connected to the first component in an integrally bonded manner, for example by welding (in particular by "(remote) laser welding"), or in another manner.

According to a development of the invention, it is provided that the fixing element has a plurality of spherical or ball-shaped portions or is formed by a plurality of balls welded to one another.

The clamping element can be produced from plastic or from metal. In the case of a clamping element produced from plastic, it is appropriate to produce the clamping element by injection molding.

According to a development of the invention, the clamping element has a circumferential wall, on the inner side of which, or in which, the supporting portion rising in the manner of a spiral staircase or a thread is provided.

In order to facilitate the tightening of the clamping element, a "profiling" can be provided on an outer side of the circumferential wall. The profiling can be designed, for example, in the manner of a knurling or a tooth profile, the teeth of which extend parallel to the vertical axis or axis of rotation of the clamping element. Alternatively thereto, the profiling can also be formed by a polygonal profile, which has the advantage that the clamping element can be tightened, for example, by means of a wrench. Alternatively thereto, one or more wings in the manner of a wing nut could also be provided on the outside of the clamping element.

According to a development of the invention, a brim-like supporting portion protrudes radially outward, for example obliquely outward and downward, from a lower region of the circumferential wall of the clamping element. In the tightened rotational position, the clamping element is then supported in relation to the first component via the brim-like supporting portion directly or indirectly via a further component.

It can be provided that the brim-like portion extends over the entire lower circumference of the clamping element. Furthermore, it can be provided that the brim-like supporting portion is flexurally elastic, as a result of which, in the tightened state of the clamping element, a resilient support is produced between the clamping element and the first component or the further component provided between the lower side of the clamping element and the first component.

As already repeatedly indicated, the component connection according to the invention can be used for the clamping connection of the first component to a second component, wherein the second component can be arranged between an upper side of the first component and the lower side of the clamping element. The first and the second component are pressed together by the clamping element. It can be provided that a through hole is provided in the second component, through which the fixing element extends and extends further into the recess of the clamping element.

An upper side of the clamping element that faces away from or is opposite the lower side can be open. Alternatively, thereto, the upper side can be closed by an upper wall or an upper cover, which has the advantage that no contaminants whatsoever can penetrate into the recess of the clamping element from above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
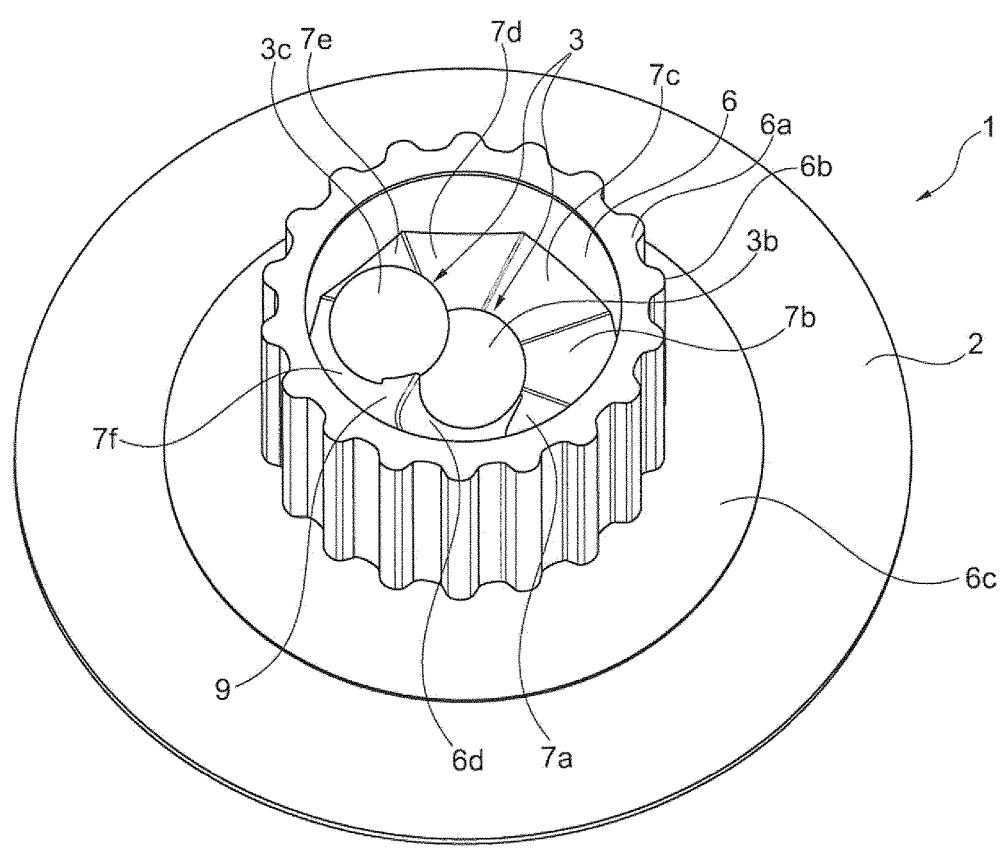
FIG. 1 is a perspective view of a component connection according to an embodiment of the invention.

FIG. 1 shows a component connection 1 with a first component 2 which can be formed, for example, by a metal sheet. A fixing element 3 protrudes from the first component 2. The fixing element 3 is formed, in the case of the exemplary embodiment shown in FIGS. 1 and 2, by three interconnected balls 3a, 3b, 3c, as can best be seen from FIG. 2.

Figure 2:
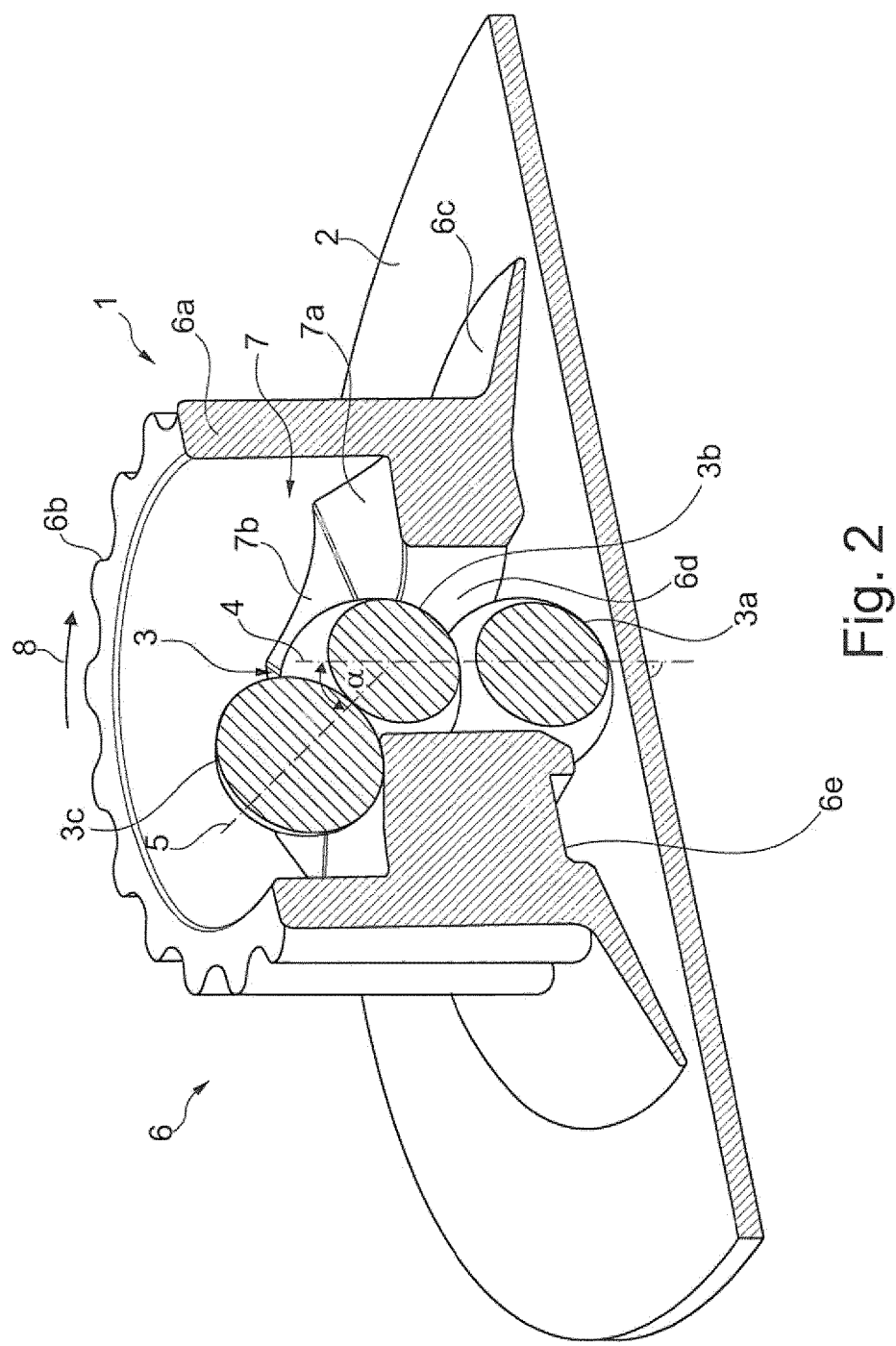
FIG. 2 is a sectioned view through the component connection shown in FIG. 1.

As can best be seen from FIG. 2, the center points of the two balls 3a, 3b lie on a perpendicular line 4 relative to the first component 2. The perpendicular line 4 encloses a right angle with the first component 2 at the contact point of the ball 3a. By contrast, a straight line 5 running through the center points of the ball 3b and the ball 3c is not perpendicular to the first component 2 at the contact point of the ball 3a. On the contrary, the straight line 5 running through the center points of the balls 3b, 3c encloses an acute angle α with the perpendicular line 4. The ball 3c therefore protrudes obliquely upward in the upper region of the ball 3b from that portion of the fixing element which is formed by the balls 3a, 3b.

A clamping element 6 is placed onto the fixing element 3 protruding from the first component 2. The clamping element 6 has a circumferential portion or a circumferential wall 6a, on the outer side of which a tooth-like profiling 6 is provided. The profiling 6 is intended to facilitate the application of a tightening torque or the tightening of the clamping element by hand, i.e. the rotation of the clamping element 6 about the perpendicular line 4 (cf. FIG. 2). A brim-like portion 6c protrudes radially obliquely downward on the outside from a lower region of the circumferential wall 6a. In the exemplary embodiment shown here, the brim-like portion 6c rests directly on an upper side of the first component 2 and therefore supports the clamping element 6 in relation to the first component 2.

The brim-like supporting portion 6c can be of a flexurally elastic or resilient design, as a result of which, in the tightened state of the clamping element, a resilient connection is produced between the clamping element 6 and the first component 2.

As can be seen from FIGS. 1 and 2, the brim-like portion 6c extends here around the entire lower circumference of the clamping element 6.

As can be seen from FIGS. 1 and 2, the interior of the clamping element 6 has a recess. A through opening 6d via which the fixing element can be introduced into the recess of the clamping element or into the interior of the clamping element is thus provided in the lower region of the clamping element 6. Furthermore, a supporting portion 7 which is designed rising upward in the manner of a spiral staircase or a thread extends along the inner circumference of the circumferential wall 6a of the clamping element 6. The supporting portion has a plurality of latching troughs 7a-7f following one another—as viewed in the circumferential direction of the circumferential wall 6a. As can best be seen from FIG. 2, the latching troughs 7a-7f that follow one another lie somewhat higher than the preceding latching troughs in a similar manner as the steps of a staircase.

In other words, the distance between latching troughs 7a-7f following one another, as measured from a lower side 6e, increases, as viewed in the tightening direction, or decreases, as viewed counter to the tightening direction. The tightening direction is indicated in FIG. 2 by an arrow 8. By rotating the clamping element 6 in the tightening direction 8, the free end of the fixing element 3 formed by the ball 3c therefore slides from one latching trough to the next higher latching trough, as a result of which the pressure exerted on the first component 2 by the brim-like supporting portion 6c is increased.

For the sake of completeness, an end stop 9, which can best be seen from FIG. 1, of the clamping element 6 is also mentioned. The end stop 9 protrudes from an inner side of the circumferential wall 6a of the clamping element 6. The end stop restricts the maximally achievable tightening position of the clamping element 6. In the maximum tightening position shown in FIG. 1, the ball 3c bears against the end stop 9. The clamping element 6 therefore cannot be rotated further in the tightening direction 8.

As an alternative to the exemplary embodiment shown in FIGS. 1 and 2, two or more components can also be connected to one another in a clamping manner via the clamping element 6. For example, a second component which is provided with a through hole can be placed onto the first component 2 in such a manner that the fixing element 3 extends through the hole provided in the second component. By the clamping element 6 being placed on and tightened, the two components can therefore be pressed together or compressed.

Figure 3:
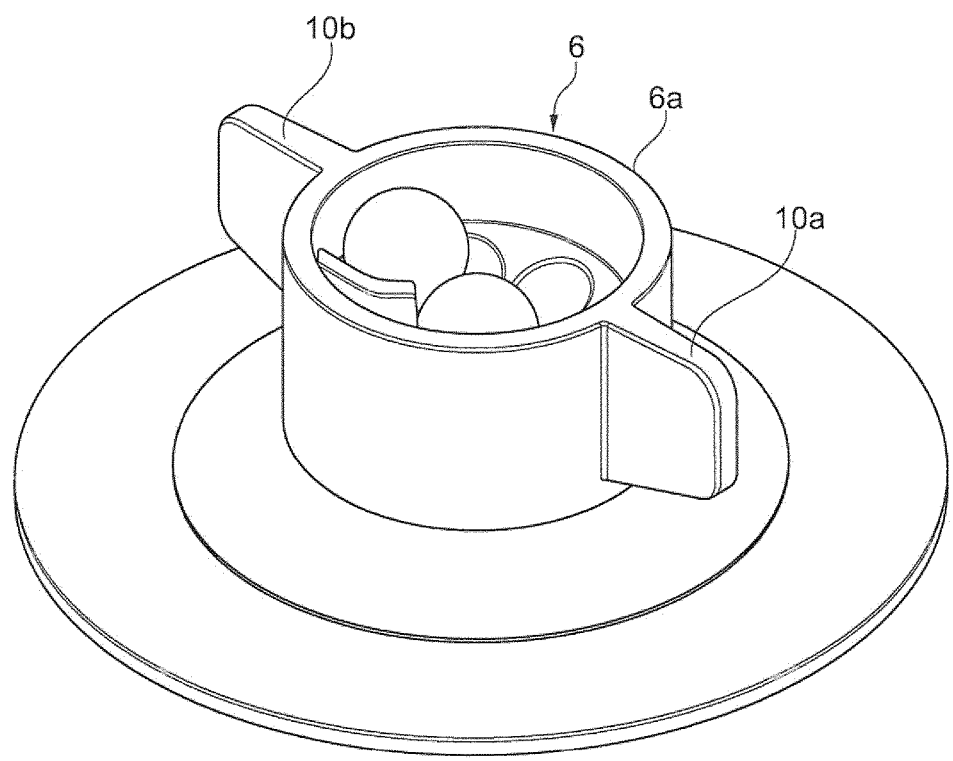
FIG. 3 is a perspective view of a further exemplary embodiment of a component connection according to the invention.

FIG. 3 shows an alternative exemplary embodiment of a component connection according to the invention. In contrast to the exemplary embodiment of FIGS. 1 and 2, no tooth-like profiling is provided on the outer circumference of the circumferential wall 6a of the clamping element 6. On the contrary, wings 10a, 10b, which are in the manner of wing nuts, protrude on mutually opposite sides of the circumferential wall 6a of the clamping element 6 and permit tightening of the clamping element 6 by hand comfortably with little effort.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A component connection, comprising:
   a first component having a fixing element protruding therefrom; and
   a clamping element wherein the clamping element comprises:
      a clamping element body, wherein the clamping element body has:
         a circumferential wall,
         a recess located internally of the circumferential wall, the recess being accessible from a bottom side of the clamping element body, and
         a rising supporting portion configured in a spiral staircase manner, the rising supporting portion being configured on an inner side of the circumferential wall or being recessed in the circumferential wall;
   wherein the rising supporting portion has a plurality of latching points arranged to follow one another in a longitudinal direction of the supporting portion;
   wherein a distance of the plurality of latching points following one another, as measured from the bottom side of the clamping element body, increases or decreases from one latching point to a following latching point;
   wherein, in a tightened rotational position, the clamping element is supported: (i) directly via the fixing element, and (ii) directly in relation to the first component or indirectly in relation to the first component via a further component, wherein:
   the fixing element projecting into the recess from the bottom side of the clamping element,
   a free end of the fixing element being configured to engage behind the supporting portion in an interlocking manner such that the free end rests on the supporting portion, and in said tightened rotational position of the clamping element, presses against the supporting portion.

2. The component connection according to claim 1, wherein the clamping element has an end stop configured to define a maximally tightened rotational position of the clamping element.

3. The component connection according to claim 1, wherein:
   in the tightened rotational position, the fixing element bears at the plurality of latching points against the supporting portion and engages behind the supporting portion at the plurality of latching points.

4. The component connection according to claim 1, wherein the free end of the fixing element has a convex shape.

5. The component connection according to claim 1, wherein the free end of the fixing element is configured as a sphere or a ball-shape.

6. The component connection according to claim 1, wherein the fixing element has at least two free ends, each of the at least two free ends pressing against different portions of the supporting portion in the tightened rotational position of the clamping element.

7. The component connection according to claim 6, wherein the at least two free ends are configured as a sphere or ball-shape.

8. The component connection according to claim 1, wherein the fixing element is composed of metal, and the metal fixing element is integrally bonded to the first component.

9. The component connection according to claim 1, wherein the fixing element comprises a plurality of spheres or ball-shapes that are welded to one another.

10. The component connection according to claim 1, wherein the clamping element is an injection molded plastic clamping element.

11. The component connection according to claim 1, wherein a profiling is provided on an outer side of the circumferential wall.

12. The component connection according to claim 1, wherein:
   the clamping element has a brim-shaped supporting portion that protrudes radially obliquely downward on an outside from a lower region of the circumferential wall, and
   in the tightened rotational position, the clamping element is supported via the brim-shaped supporting portion in relation to the first component directly on the first component or indirectly on the first component via the further component.

13. The component connection according to claim 12, wherein the brim-shaped supporting portion is configured to be flexurally elastic.

14. The component connection according to claim 1, further comprising:
   a second component arranged between an upper side of the first component and the bottom side of the clamping element,
   wherein the first component and the second component are pressed against one another via the clamping element in the tightened rotational position.

15. The component connection according to claim 14, wherein the second component has a through-hole through which the fixing element of the first component extends.

16. The component connection according to claim 1, wherein the clamping element has a top cover by which a top side of the clamping element opposite the bottom side into which the fixing element extends is openable or closable.

17. The component connection according to claim 1, wherein the plurality of latching points are configured as trough-shaped depressions in the rising supporting portion.

18. The component connection according to claim 1, wherein a profiling is provided on an outer side of the circumferential wall and wherein a brim-shaped supporting portion protrudes radially obliquely downward on an outside from a lower region of the circumferential wall.

* * * * *